United States Patent [19]
Burke

[11] Patent Number: 5,296,973
[45] Date of Patent: Mar. 22, 1994

[54] AUXILIARY SIDE VIEW MIRROR MODULE

[76] Inventor: David W. Burke, 809 Taylor St., Bay City, Mich. 48708

[21] Appl. No.: 945,502

[22] Filed: Sep. 16, 1992

Related U.S. Application Data

[63] Continuation-in-part of Ser. No. 861,101, Mar. 31, 1992, abandoned.

[51] Int. Cl.$^5$ .............. G02B 7/18; G02B 5/10; G02B 1/06; G02B 1/08
[52] U.S. Cl. .................. 359/865; 359/871; 359/881; 359/844; 359/850; 248/475.1
[58] Field of Search .............. 359/854, 865, 871, 872, 359/881, 864, 850; 248/475.1, 476, 477, 480

[56] References Cited

U.S. PATENT DOCUMENTS

| | | | |
|---|---|---|---|
| 1,969,415 | 8/1934 | Ostroff | 359/854 |
| 3,790,117 | 2/1974 | Winkler | 359/865 |
| 3,954,328 | 5/1976 | Ames | 359/865 |
| 4,598,982 | 7/1986 | Levine | 359/865 |
| 4,892,400 | 1/1990 | Brooks et al. | 359/865 |
| 4,892,401 | 1/1990 | Kittridge et al. | 359/871 |
| 4,921,340 | 5/1990 | Dyer | 359/864 |

*Primary Examiner*—Ricky D. Shafer
*Attorney, Agent, or Firm*—Merlin B. Davey

[57] ABSTRACT

This invention provides an auxiliary side view mirror module comprising a casing configured to slidably fit over at least a portion of a mounted side view mirror and wherein the casing is supported on the side view mirror by sliding opposed channel sections over opposed edges of the side view mirror mounting, the casing including an auxiliary mirror supported alongside and co-planar with the side view mirror and further including means adapted to adjust the casing to fit side view mirror housings of different depths or thicknesses and to reduce vibrations.

1 Claim, 1 Drawing Sheet

AUXILIARY SIDE VIEW MIRROR MODULE

CROSS-REFERENCE TO RELATED APPLICATIONS

This application is a continuation-in-part of copending application Ser. No. 861,101 filed Mar. 31, 1992, now abandoned.

BACKGROUND OF THE INVENTION

Field of the Invention

The present invention relates to automative side view mirrors and, more particularly, to an auxiliary mirror adapted to be removably attached to the housing of the side view mirror for extending the viewing area of the side view mirror.

Description of the Related Art

Most automotive vehicles today have side view mirrors mounted on the exterior of the front doors for enabling the driver to see vehicles approaching from the rear. These side view mirrors, although adequate in most instances, fail to reflect vehicles in what is commonly referred to as "blind spots" located near the rear end of the vehicle. These blind spots can hide other vehicles from the view of the driver, resulting in a collision when the driver changes lanes without turning to see if other vehicles are in the adjacent lane.

The problem is specially acute when the vehicle is towing a trailer, a boat, a camper or the like. The side view mirrors on the vehicle are not large enough or spaced far enough away from the vehicle to show the entire blind spots back to the trailer being towed. For this reason, temporary side view mirrors extending farther outwardly from the side of the car have been utilized.

U.S. Pat. No. 4,892,401 teaches an auxiliary mirror module for use with an automotive side view mirror of the type mounted in a housing. The housing is mounted on a support bracket configured to be attached to the exterior of a vehicle. The module comprises an elongated, planar casing configured to be slidably fit over at least a portion of the housing.

The module further comprises a pair of opposed channel sections supported on the casing. The channel sections are separated by distances substantially equal to a dimension between opposed edges of the side view mirror housing so that the casing may be supported on the housing by sliding the channel sections over the opposed edges of the housing. One of the ends of the casing extends laterally outwardly from the vehicle.

An auxiliary mirror is supported by the casing at the laterally extending end of the casing. The auxiliary mirror is supported alongside and substantially coplanar with the side view mirror when the casing is supported on the mirror housing.

The module further comprises a threaded fastener supported on the casing adapted to engage the side view mirror support bracket and retain the casing relative to the side view mirror housing.

While the module of U.S. Pat. No. 4,892,401 is operative, it has been found that the vibrations resulting from normal vehicle use cause considerable distortion and motion in the field of vision provided by the auxiliary mirror, thereby reducing the effectiveness and value of said mirror. A further problem arises from the fact that there may be a substantial variation in the depth or thickness of side view mirror housings made by various manufacturers, thus requiring the production of different casings for each type of side view mirror housing.

SUMMARY OF THE INVENTION

The present invention provides an auxiliary side view mirror module for extending the viewing area of an automotive side view mirror of the type mounted in a housing, said housing being mounted on a support bracket configured to be attached to the exterior of a vehicle, said module comprising:

an elongated planar casing;

a pair of opposed channel sections supported on the casing, said channel sections being separated by a distance substantially equal to a dimension between opposed edges of the side view mirror housing so that the casing may be supported on said housing by sliding the channel sections over said opposed edges of the housing so that one of the ends of the casing extends laterally outward from the vehicle;

an auxiliary mirror supported by said casing at said laterally extending end so as to be supported alongside and substantially co-planar with the side view mirror housing; said casing comprising, in addition to said opposed channel sections, means adapted to adjustably engage an automotive side view mirror housing to hold said casing firmly to said mirror housing and to substantially eliminate vibrations in said auxiliary mirror.

The auxiliary mirror may be attached to said casing by a number of means as known in the art, but is preferably attached by a pivotal mounting for adjustable extension of the viewing area. The means of attachment of said auxiliary mirror are not critical, it only being preferred that said mirror be adjustable and that the support thereof be sufficiently firm to avoid and/or substantially reduce the usual vibrations and/or distortions generally found in such mirror when in use.

In the drawings, FIG. 1 illustrates a module in accordance with one embodiment of this invention;

FIG. 2 is taken along the line 2—2 of FIG. 1 and illustrates two means of adjusting the casing to hold said casing firmly to said side view mirror housings of varying depth or thickness; and FIG. 3 illustrates a wedge means for engaging said side view mirror housings and holding said casing firmly to said housing.

DETAILED DESCRIPTION OF THE INVENTION

Figure 1:
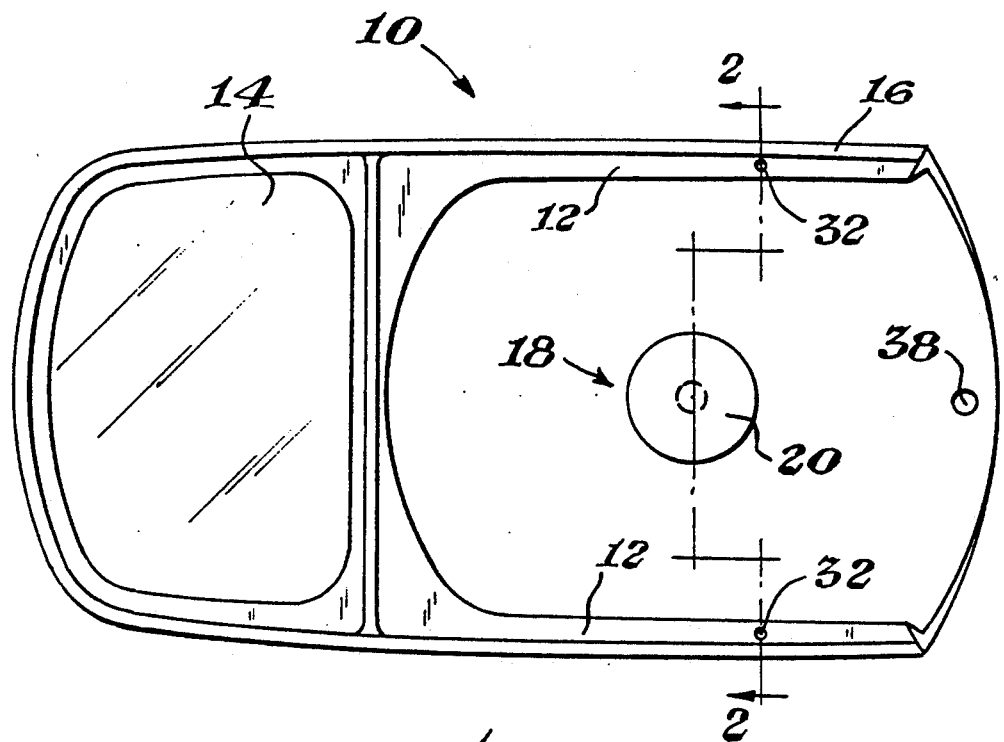

Referring to the drawings, auxiliary mirror module 10 is adapted to be mounted over a conventional side view mirror by slidably fitting over the housing of a side view mirror as shown, for example, in U.S. Pat. No. 4,892,401 and in co-pending application Ser. No. 861,101 filed Mar. 31, 1992 which are incorporated herein by reference. As shown in FIG. 1, casing 16 comprises channel lips 12, adapted to engage the rearward-facing surface of a side view mirror housing when said housing is mounted on a vehicle, an auxiliary side view mirror 14, and a means 18 adapted to engage the forward-facing surface of a side view mirror housing, the forward-facing surface being as viewed when said housing is mounted on a vehicle.

Means 18 may comprise a tough, wear resistant, resilient, foamed synthetic plastics material 20 positioned on and affixed to an interior portion of casing 16.

Figure 2:
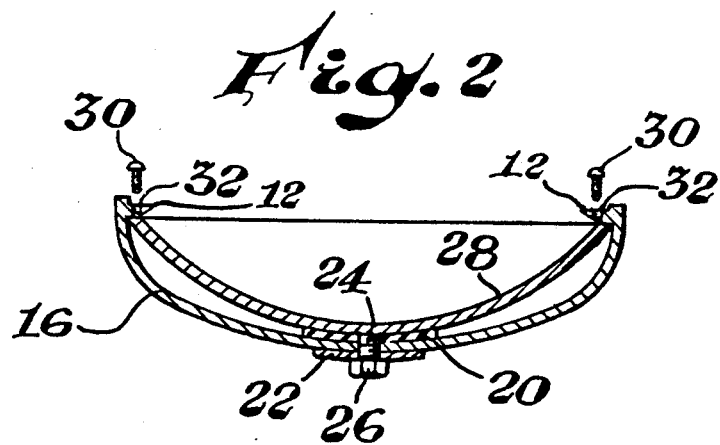

FIG. 2 illustrates two further means of adjusting casing 16 to fit side view mirror housings having varying depths or thicknesses. As shown in FIG. 2, means 18 may further comprise a tough, wear-resistant, resilient, preferably plastics material 20 adapted to conform to a forward-facing surface of a side view mirror housing 28 and a threaded bolt 24 having, preferably, a knurled knob 26 on one end thereof and adapted to screw into and through a reinforced portion 22 of said casing 16 and to engage plastics material 20 and hold said plastics material 20 securely against the forward facing surface of said side view mirror as viewed when said housing is mounted on a vehicle.

FIG. 2 also illustrates an alternative means of adapting casing 16 to engage housing 28. In this embodiment two or more threaded bolts 30 are employed to pass through threaded holes 32 in channel lips 12 to engage the face or rearward-facing surface of side view mirror housing 28.

Figure 3:
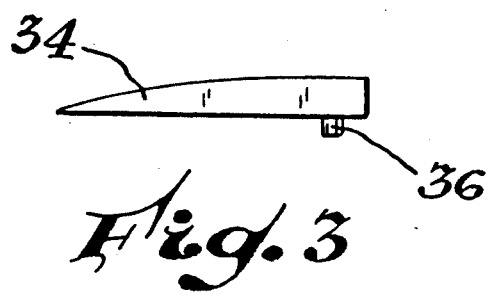

A still further embodiment of this invention comprises a wedge shaped tongue 34 as shown in FIG. 3 which is adapted to slide into any space between the forward-facing surface of the side view mirror housing 28 and casing 16. Tongue or wedge 34 may be firmly positioned and held in place, for example, by one or more pins 36, said pins being adapted to fit snugly into hole or recess 38 of casing 16 as shown in FIG. 1.

With the advent of electrically operated side view mirrors it is sometimes important that channel lips 12 of casing 16 be of a width sufficient to engage the side view mirror housing but not of a width such as to interfere with electrically adjusting said side view mirror.

Casing 16 may be fabricated from any one of a variety of materials such as, for example, metals or snythetic polymers. Plastics material 20 is preferably fabricated of a tough, wear resistant natural or synthetic foamed material.

The auxiliary side view mirror module of this invention has been found to reliably fit over and attach to the side view mirror of most vehicles, regardless of the type of mounting of said mirrors, thus obviating the limitation of the module described in, for example, U.S. Pat. No. 4,892,401, which requires that the side view mirror be mounted with a post-type mounting.

In addition, it has been found that the module of this invention provides for essentially vibration free attachment to vehicle side view mirrors by virtue of the cross-braced support of the auxiliary mirror and the additional firming provided by the foamed patch or cushion on the interior surface of the module casing.

While the module of the invention has been described with sole reference to the driver's side mirror, it is clear that said module may be adapted to fit over a side view mirror on the right side of the vehicle.

Various modifications may be made in the present invention without departing from the spirit or scope thereof as will be readily apparent to those skilled in the art.

I claim:

1. An auxiliary side view mirror module for extending the viewing area of an automotive side view mirror mounted in a housing on a support bracket configured to be attached to the exterior of a vehicle, said automotive side view mirror having a forward-facing surface and a rearward-facing surface as viewed when said automotive side view mirror is mounted on a vehicle, said module comprising:

an elongated planar casing;

a pair of opposed channel sections supported on the casing, said channel sections being separated by a distance substantially equal to a dimension between opposed edges of said automotive side view mirror housing so that said casing is supported on said housing by sliding the channel sections over said opposed edges of said housing so that one of the ends of said casing extends laterally outward from the vehicle;

an auxiliary mirror mounted in said casing at said laterally extending end so as to be supported alongside and substantially co-planar, with said side view mirror housing; said casing comprising an interior and exterior surface and means for adjustably engaging the forward-facing surface of said automotive side view mirror housing, said means comprising a tough, resilient, semi-rigid plastic material positioned between the interior surface of said casing and the forward-facing surface of said side view mirror housing and engaged by means of an adjusting screw, said plastics material being adapted to conform to the forward-facing surface of said side view mirror housing.

* * * * *